Figure 1:
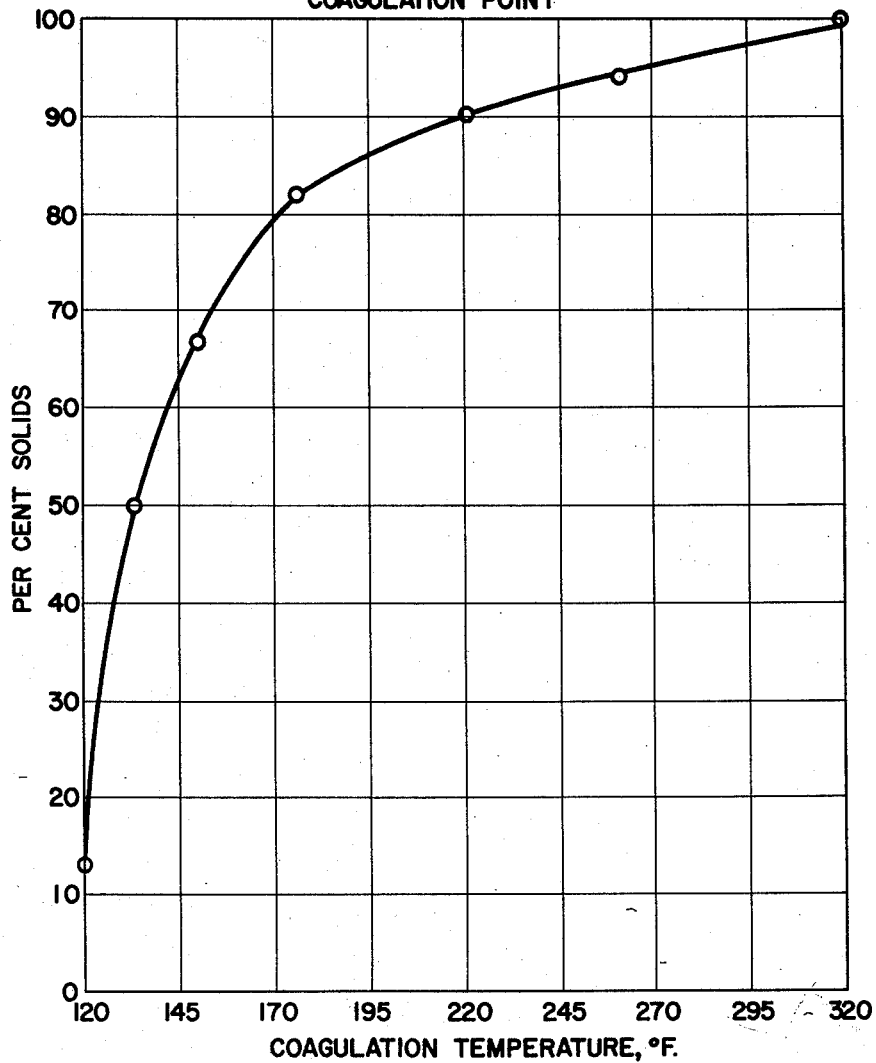

United States Patent Office 3,076,715
Patented Feb. 5, 1963

3,076,715
DEHYDRATION OF FLUID FATTY MIXTURES ABOVE NORMAL COAGULATION TEMPERATURE
Charles Greenfield, 3 Templeton Arms, N. Broad St., Elizabeth, N.J.
Filed Aug. 31, 1959, Ser. No. 837,105
10 Claims. (Cl. 99—210)

This invention relates to improvements in the dehydration of a fluid system comprising a mixture of fat, non-fat solids and water. More particularly it relates to a process of the nature indicated wherein these mixtures, usually foods of natural origin, are dehydrated at temperatures above the normal coagulation temperatures but under conditions such that coagulation does not occur whereby a reduction in the bacterial count of the dehydrated system is obtained.

This application is a continuation-in-part of Serial No. 617,987, filed October 23, 1956, now U.S. Patent 2,979,408.

In U.S. Patent 2,651,647 it was pointed out that the dehydration of mixtures of fat, non-fat solids and water could be carried out at lower than usual temperatures to avoid coagulation of proteins by utilizing sub-atmospheric pressures and a fat liquid medium as a heat transfer agent. This operation permits of the recovery of products which have not deteriorated in taste, quality or other characteristics as compared to the original mixture being treated.

In Serial No. 617,987 a method of avoiding gel formation in the systems contemplated by increasing the concentration of discreet non-fat solids is covered. The temperatures utilized in that case are rather low in order to assure preservation of the quality of the product.

Quite often it is necessary to sterilize or substantially reduce the bacterial content of the desired dehydrated product. Radiation has been utilized at low temperatures but this often results in off flavors and is very costly to use. Spray drying quite often actually causes the introduction of extraneous bacteria. Elevated temperatures have heretofore been considered undesirable because coagulation of the non-fat solids can also cause deterioration in product quality and flavor.

It has now been found that fluid systems comprising a mixture of fat, non-fat solids and water can be dehydrated at a temperature above that at which the non-fat solids are normally coagulated. This is accomplished by increasing the concentration of non-fat solids in the system whereby coagulation does not occur or is substantially, i.e. at least 50 wt. percent, avoided and the bacterial count of the dehydrated system can be substantially reduced.

The mixtures being treated are thus conveniently fatty foods of usually natural origin or foods that become part of a component of a fatty product by fat addition. These may also be biochemicals or other materials that are either sensitive to heat in low concentrations of solids or most efficiently dried by this technique or can be sterilized or reduced in bacterial count by this technique, and either are fatty in nature or become part of the product containing fat.

Some of the foods conveniently dried by this technique are milk, cream, ice cream, cheese, fish, whole eggs, vanilla, egg yolks, egg whites, cake mixes, mayonnaise, frostings, puddings, soups, chocolate, yeast, etc. Animal protein products derived from packing houses, either of edible or inedible grade, such as fatty tissues, meat, bones and various organs, and fluids such as blood, can also be treated by this invention.

This invention can also be applied to the drying of materials ordinarily subject to deterioration because of high moisture content, where such materials are eventually mixed with fatty materials. Examples are animal and poultry feed dry mixes containing fat. The fat may be added as, e.g. tallow or grease, such as available from the rendering industry. Flour of high moisture content (10%–12%) which is incorporated into cake mixes can be advantageously dried in this fashion.

The systems treated comprising principally the three components mentioned are heated while in the form of a fluid system. The term "fluid" is intended to be synonymous with "liquid," i.e., taking the shape of the container. This will thus also include heavy, viscous fluids which are pumpable. The solids in fat may be of small particle size, e.g. as found naturally in liquid materials, such as milk, or may be fibrous such as dried animal tissue. The components can thus be present in a suspension, a colloidal solution and/or a true solution.

The words "fat," "fatty," and the like refer to the natural glycerides, the free fatty acids thereof, and includes as well the unsaponifiable lipoid soluble concomitants of the natural fats and oils, such as the oil soluble vitamins, steroids, phospholipids, and other naturally occurring lipoid solubles. Derivatives of the foregoing as well as synthetic "fats," glycerine and petroleum oils such as petroleum mineral oil, jellies, etc. are also included.

As stated previously and as also disclosed in U.S. Patent 2,651,647, a fat liquid medium is used as a heat transfer agent to remove moisture so as to economically achieve certain advantages. The added fatty liquid medium can be the same kind of fat as that present in a natural fat-containing substance, or it can be another fat satisfactory for the operation. The fat selected as the fatty liquid medium can be chosen with the viewpoint of securing suitable antioxidant values, taste, odor, compatibility from the food viewpoint, such as saturated and unsaturated fatty acid content, etc.

In certain cases it can be advantageous to actually utilize a different satisfactory fat liquid medium than the one naturally found in the system so as to come up with a new food product, e.g. replacing undesirable saturated fat fractions with more desirable fat. The fat liquid media are characterized by being fluid under the conditions of treatment. These media can be added prior to the initiation of dehydration or after partial dehydration and both types of operation are included herein.

The quantity of the added satisfactory liquid medium normally required is such that the ratio of the fat in the original material plus the added fat liquid medium to the dry non-fat solids is in the range of a minimum of about two to one to twenty to one parts by weight, or higher. It should be noted that at higher temperatures and/or higher concentrations in some cases this ratio can be as low as one to one and is intended to be covered herein. It is surprising that bacterial count is reduced by the process of this invention inasmuch as it had been thought that increased fat content was inconsistent therewith.

The non-fat solids typically found in the mixtures vary with the particular material, i.e., in whole milk the non-fat solids are casein, lactobulin, lactose materials and vitamins. In cream they are largely the same as milk except in lesser quantity. In eggs, they are largely albumins; in cake mixes, they are largely flour, sucrose, skim milk, egg proteins, and in soups, they are largely vegetable proteins and meat proteins.

As stated previously, the coagulation of the non-fat solids is substantially avoided by increasing their concentration in the fluid system. This increased concentration can be obtained by conducting a preliminary dehydration at a temperature below the coagulation temperature and then heating to a higher temperature. This increased concentration can also be obtained by the addition of extraneous, non-fat solids or can be produced in situ where solubility decreases with decreasing temperature, by cooling or refrigeration of at least a portion of the system being treated to form these solids and maintaining or recycling them to the system undergoing dehydration.

The actual concentration of solids required and temperature utilized in any given system so as to obtain a dry product, and an absence of coagulation at above the normal coagulation temperature is empiric and can readily be obtained for any given system. In general the temperatures, which are above the normal coagulation temperatures of the process of this invention, are in the range of 120° to 350° F. The solids concentration required to produce this result in general is in the range of from 25 to 99+ wt. percent on a fat free basis. The pressures utilized in the dehydration are in the range of 2 to 3 mm. of mercury absolute to atmospheric or up to a pressure of 25 p.s.i. Time of heating above normal coagulation temperature is in the range of 30 seconds to 1 hour at continuous operation. The temperature utilized in general varies inversely with the time i.e. batch operations at a somewhat longer time use somewhat lower temperatures.

Typical examples of systems that can be treated by the process of this invention, coagulation temperatures, and the temperatures to which they can be heated without substantial coagulation with an increase in solids concentration are tabulated below.

|  | Solids 25% | Water 75% | Solids 50% | Water 50% | Solids 75% | Water 25% | Solids 95% | Water 5% |
|---|---|---|---|---|---|---|---|---|
| Meat °F | 120 | | 135 | | 170 | | 250–275 | |
| Fish (Filet of Sole) °F | 110 | | 125 | | 160 | | 225 | |

These are temperatures where the proteins remain uncoagulated, however, other undesirable changes may take place, i.e. reaction between fat, sugars, etc. so that the time of contact at the elevated temperature must be at a minimum as compared to operation at lower temperatures. For example, fish oils are most sensitive to change and should be maintained under vacuum or nitrogen gas so as to avoid product change.

Thus the variation of coagulation temperature of egg albumin with increasing solids concentration is shown in the graph, FIGURE 1. This curve is fairly typical for most protein systems.

This invention will be better understood by reference to the following examples and preferred embodiments as discussed in further detail in connection with the flow diagram shown in the drawing.

*Example 1*

Figure 2:
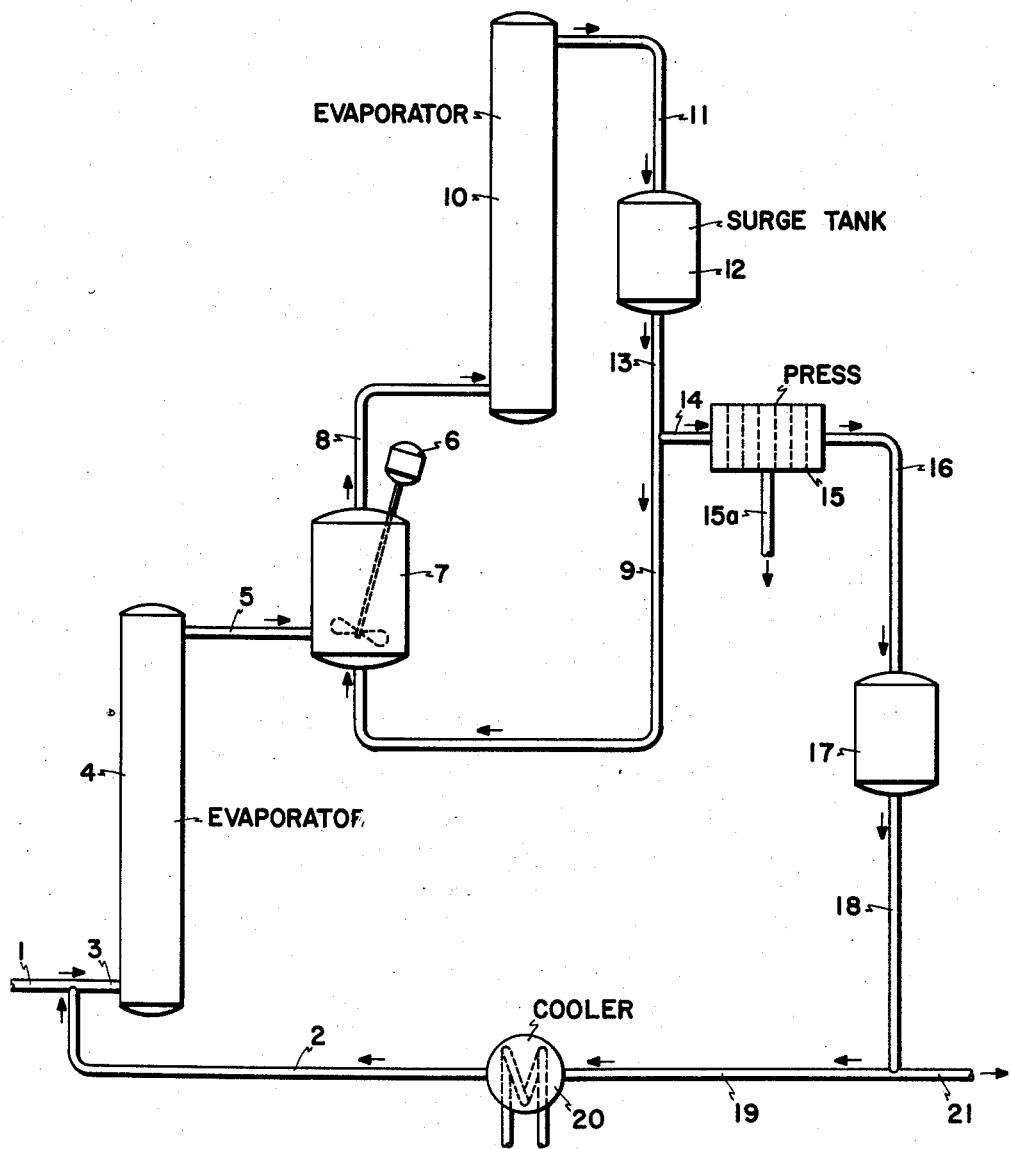

In the flow diagram, FIGURE 2, 100 parts of whole egg flowing in line 1 containing 74 parts of water, 14.8 parts of non-fat solids, 3.7 parts of lecithin and 7.5 lbs. of egg fat is blended with approximately 140 parts of fat from line 2, melting point of fat is less than 110° F. The mixture flows through line 3 into evaporator 4 thereby maintaining a fluid fat mixture in the evaporator system.

This mixture is concentrated in continuous evaporator 4 to approximately 50% solids content (including lecithin) on a fat free basis to produce a fluid mixture of 14.8 parts of non-fat solids, 3.7 parts of lecithin, 18.5 parts of water and 147.5 parts of fat. The evaporator temperature is maintained at approximately 100° F. and at a vacuum of 28″+.

The concentrated egg solids in excess fat, thereafter discharges through line 5 and is fed to mixing tank 7 which has an agitator 6. Recycle line 9 delivers a stream into mixing tank 7 consisting of 44.4 parts of non-fat solids, 11.1 parts of lecithin, 2.25 parts of water, and 462.5 parts of fat. The ratio of fat to non-fat solids plus lecithin is approximately 8:1. The combined stream leaving the mixing tank 7 contains 59.2 parts of non-fat solids, 14.8 parts of lecithin, 20.75 parts of water and 610.0 parts of fat and enters evaporator 10 through line 8. The solid content on a non fat-non lecithin basis is equal to 74.2% at which concentration, gel and gummy stages are avoided. The increase in solids not fat concentration has been from 16.7% on a non-fat basis to 74.0% on a non-fat basis. At this concentration of egg solids the approximate temperature of coagulation is 160° F.–165° F. If the temperature of the evaporating fluid in the evaporator is chosen to be 145°–150° F. for the second stage to safely be below the coagulation temperatures, the steam temperatures may be 160° to 165° F. without causing any coagulation of protein at the surface of the heat transfer material, known as "the skin temperature." The vacuum can be maintained at 28+ allowing ample disengaging differential of the vapor from the fluid mixture since the boiling point of water at this vacuum is 100° F. or less and the operating slurry temperature is 145° F.–150° F.

The moisture content of the product leaving the evaporator 10 is at approximately 5% but it is often desirable to maintain high evaporation rates at somewhat higher moisture contents such as 15% to 20%. If such is the case a third evaporator stage can be operated at temperatures of 175° F. and the moisture can rapidly be reduced to any desired level. It is important to use high vacuum to maintain quality of egg lecithin which is very sensitive to elevated temperatures.

The slurry discharging from the second stage evaporator 10 through line 11 contains 59.2 parts of non-fat solids, 2.25 parts of water and 610 parts of fat and is delivered to surge tank 12. A portion of the dry slurry is processed through line 14 to high pressure press 15 where pressures of 250–500 p.s.i. will produce dry hard cakes of original fat content of whole eggs shown discharging at 15a. The filtered oil is delivered to surge tank 17 where it is returned to process through lines 18, 19 and cooler 20 to line 2. The oil is cooled so that the temperature after blending with incoming feed does not exceed 120° F. which is the coagulation point of the entering raw material. If higher pressures are used such as in the range of 1000 p.s.i. to 10,000 p.s.i. very low fat cakes can be obtained, and egg oil is available for marketing of very high quality.

If a forced circulation type evaporator is used, a high solid content could be maintained in the circulating stream such as 90% on a not fat basis and the single stage of operation would carry the solids concentration to 5% to 10% moisture content and lower. It is also important to note that the "browning reaction" can be minimized at the high solid concentration of over 90% non-fat solids, so that the temperature effect is also minimized. Thereby the drying can be carried forward at approximately 150° F. with a heating medium of 175° F. or higher without any significant coagulation of the proteins or change in quality of product. If desired after the drying has been completed additional temperature increase can be accomplished to further reduce the bacterial count. Reduction of bacterial count for whole egg has been very difficult to accomplish heretofore because of the coagulation of proteins, when treated at the dilute stage of 16.7% non-fat solids content.

A double effect evaporator system can be substituted for the two stage system described, where the heat is utilized more effectively. The concentration stage is carried out at a lower temperature and the main drying stage is carried out at a higher temperature but lower vacuum than the concentrating stage. In this manner more efficient use of steam and cooling water is obtained.

This method can be applied to the inedible rendering field where waste fats, offal and bone are presently dry-rendered at atmospheric conditions at 240°–250° F. in batch cookers using 60 to 80 p.s.i. steam pressures equivalent to temperatures of 310° F. and 325° F. The process would consist of feeding finely ground material in excess fat to produce a liquid slurry into a continuous evaporator operated at atmospheric pressure and at 225° to 275° F. approximately by maintaining a high concentration of solids in the circulating stream 95%–99+%. It is to be noted that these materials are ordinarily heavily contaminated with bacteria and the application of this process would effectively dry the material and reduce the bacterial count sharply at the same time. In order to accomplish this operation it is important that the feed temperature be increased in accordance with increase in solids concentration so that a minimum coagulation of proteins take place. This can be accomplished by withdrawing a portion of the circulating stream and blending at controlled temperature with the feed stream by means of a staged blending operation. Cooling may be required as well depending on the degree of coagulation tolerated.

Many products can be pasteurized or sterilized by this technique which would have deteriorated in product quality otherwise by present methods. For this reason it may be advantageous to dehydrate the food product, reduce the bacterial count and reconstitute with sterile water, thereby achieving a low bacterial count product otherwise very difficult to obtain. For example, dried eggs often have a high Salmonella count, which are pathogenic organisms. In order to destroy the organisms, temperatures are required which cause destruction of some of the functional properties of the egg so that dried eggs are recommended for use only in dishes that are thoroughly cooked according to "Plant Sanitation of Drying and Dehydration of Foods" by Harry W. von Loescke, page 229. As can be noted, an assured elimination of this pathogenic organism could greatly increase the potential for dry egg products.

*Example 2*

Inedible animal tissue sometimes containing bones derived from cattle has a very high bacterial loading. The sample contained a greater than normal amount of fecal material, etc. A spore former, *Bacillus globigii*, was also added to the mixture. The bacterial count before addition of *Bacillus globigii* equalled 286,600,000 organisms/gram. After inoculation with *Bacillus globigii* the count increased to 324,000,000.

The material was first dried in a low temperature evaporator at a temperature of less than 120° F. to a moisture content of 5% on a fat free basis to increase solids concentration. The material was originally dried utilizing the oil system described, so that the ratio of oil to non-fat solids was equal to 10:1. The bacterial count dropped to 1,111,500 microorganisms/gram. The slurry was then heated to 250° F. under atmospheric conditions for 10 minutes and immediately cooled. The bacterial count was reduced to 1900 organisms/gram. When the material was heated to 275° F. the bacterial count was reduced to 500 microorganisms/gram. In both cases listed above, the proteins were essentially in the uncoagulated state and had the appearance of raw dried meat proteins which are of fibrous nature compared to the cooked powdery dry product. The product rapidly reconstituted with water similar to the product dried at less than 120° F. The tallow was light in color and of high quality.

The reduction in bacterial count from the low temperature dried product to the product heated in slurry form to 275° F. was equal to 99.999% from the original raw material and 99.95% from the low temperature treated dry product.

In a similar fashion, ground raw fresh meat may be dried at a low temperature and then subjected to elevated temperatures to reduce the bacterial count or to sterilize the finished product. These products can be stored as a dry fibrous powder, which can be rapidly reconstituted with water. If hot or boiling water is used the product is instantly cooked since the dry proteins are essentially in the "uncooked" or raw state. This is a valuable type of product for baby foods since the dry product can be stored for almost unlimited time without refrigeration and is conveniently prepared with a minimum of time by the addition of hot water. Other ground meat products can be advantageously utilized in this fashion. An additional advantage of these type products is the excellent stability resulting from destruction of enzymes during the elevated temperature of the heating period and the reduction of moisture at these temperatures.

The fat content of these products can be advantageously controlled to any desired point or modified as previously described.

A wide variety of different types of equipment and combinations can be used in the process. Continuous dehydration and sharp bacterial count reduction can be effected without vacuum by feeding in raw material and blending with the main stream at successively higher temperatures correlated with the coagulation points.

The advantages of this invention will be apparent to those skilled in the art. The technique offers a most economic means of sterilizing many food products which ordinarily change significantly at usual sterilizing temperatures and even at pasteurizing temperatures, such as fluid milk, eggs, etc. The bacteriological quality of foods is improved and long storage life is obtained through the destruction of enzymes. The dehydrated products can be reconstituted by the addition of boiling water. This is particularly useful in military applications and baby food. The flavor of all the products is of superior quality.

In a somewhat similar manner, systems with no coagulation problem, e.g. already cooked meats, various powders, etc., which are at least 80% dry can be substantially reduced in bacterial content. This is accomplished by heating the finely divided system, dispersed in oil, at elevated temperatures for short intervals of time.

It is to be understood that this invention is not limited to the specific examples and equipment which have been offered merely as illustrations and that modifications may be made without departing from the spirit of the invention.

What is claimed is:

1. In a process of dehydrating a liquid system comprising a mixture of fat, non-fat solids subject to coagulation, and water, wherein the ratio of fat to non-fat solids is at least 1:1 by weight, the improvement which comprises heating the liquid system at a pressure in the range of 2 mm. mercury to 25 p.s.i. and a maximum temperature of 350° F. and one at which the non-fat solids are normally coagulated, in the absence of a fat solvent, but at an increased concentration of non-fat solids in the range of 25 to 99+ wt. percent based on the system on a fat-free basis, the increase being accomplished by the addition of non-fat solids, such that coagulation is substantially avoided.

2. The process of claim 1 in which a reduction in the bacterial count of the dehydrated system is obtained.

3. The process of claim 1 in which the heating time at above normal coagulation temperature is in the range of 30 seconds to 1 hour.

4. The process of claim 1 in which the mixture is an inedible animal tissue.

5. The process of claim 4 in which a reduction in bacterial count of the dehydrated system is obtained.

6. The process of claim 1 in which the dehydration is carried out continuously at a temperature of 225° to 350° F.

7. The process of claim 1 in which the system being dehydrated is milk.

8. The process of claim 1 in which the system being dehydrated are eggs.

9. The process of claim 1 wherein the concentration of non-fat solids, after the addition thereof, is in excess of 90 wt. percent.

10. The process of claim 1 wherein the concentration of non-fat solids, after the addition thereof, is in excess of 95 wt. percent.

References Cited in the file of this patent

UNITED STATES PATENTS

| | | |
|---|---|---|
| 2,229,376 | Fauth et al. | Jan. 21, 1941 |
| 2,467,529 | Hormel | Apr. 19, 1949 |
| 2,479,310 | Chapin | Aug. 16, 1949 |
| 2,539,544 | Levin et al. | Jan. 30, 1951 |
| 2,651,647 | Greenfield | Sept. 8, 1953 |
| 2,919,194 | Johnston | Dec. 29, 1959 |